(12) United States Patent
Nagaoka

(10) Patent No.: US 7,014,758 B2
(45) Date of Patent: Mar. 21, 2006

(54) WATER TREATMENT DEVICE

(76) Inventor: Tadayoshi Nagaoka, 573-2, Oaza Ureshi, Tondabayashi-shi, Osaka-fu (JP)

( * ) Notice: Subject to any disclaimer, the term of this patent is extended or adjusted under 35 U.S.C. 154(b) by 294 days.

(21) Appl. No.: 10/399,119

(22) PCT Filed: Oct. 19, 2001

(86) PCT No.: PCT/JP01/09175

§ 371 (c)(1),
(2), (4) Date: Sep. 25, 2003

(87) PCT Pub. No.: WO02/34677

PCT Pub. Date: May 2, 2002

(65) Prior Publication Data

US 2004/0040904 A1 Mar. 4, 2004

(30) Foreign Application Priority Data

Oct. 24, 2000 (JP) .............................. 2000-324268

(51) Int. Cl.
*C02F 1/64* (2006.01)

(52) U.S. Cl. ...................... 210/209; 210/722; 210/205

(58) Field of Classification Search ................ 210/722, 210/209, 205
See application file for complete search history.

(56) References Cited

U.S. PATENT DOCUMENTS

| 2,237,882 | A | * | 4/1941 | Lawlor et al. | .............. 210/722 |
| 5,096,580 | A | * | 3/1992 | Auchincloss | ................ 210/202 |
| 5,096,596 | A | * | 3/1992 | Hellenbrand et al. | ....... 210/721 |
| 5,534,143 | A | * | 7/1996 | Portier et al. | ............... 210/151 |

FOREIGN PATENT DOCUMENTS

EP 223563 A2 * 5/1987
EP 287205 A1 * 10/1988

OTHER PUBLICATIONS

International Preliminary Examination Report.

* cited by examiner

*Primary Examiner*—Duane Smith
*Assistant Examiner*—Douglas J. Theisen
(74) *Attorney, Agent, or Firm*—Hedman & Costigan, P.C.

(57) ABSTRACT

A water treatment device capable of filtering out iron and manganese in raw water by oxidizing them and making them insoluble in water includes a raw water supply tube (4), one or more jet nozzles (5), each being at one end portion thereof in communication with the raw water supply tube (4) and having at the other end thereof a raw water jetting outlet for blowing out the raw water in a jet stream, one or more air introducing tubes (6) provided in correspondence to the jet nozzle or jet nozzles (5), each being at one end portion thereof opened to the atmosphere and being at the other end portion thereof opened to the inside of a corresponding one of the jet nozzles (5) upstream of the raw water jetting outlet and a filter container (3) containing a filter layer (2).

8 Claims, 6 Drawing Sheets

WATER TREATMENT DEVICE

TECHNICAL FIELD

This invention relates to a water treatment device and, more particularly, to a water treatment device capable of treating water soluble substance such as iron and manganese in underground water by oxidizing them and thereby making them insoluble with a simple and compact device without using an oxidizing agent or a flocculant.

BACKGROUND ART

Underground water is utilized as raw water for tap water and also utilized in industries which require a large quantity of water such as food, soft drink, beverage, dyestuff industries and also in public baths. In these industries, iron and manganese contents contained in underground water have raised a problem. While iron and manganese are substances which are necessary for a human body, contents of these substances exceeding a certain amount give a metal taste to water and turn water to red or black water, thereby making the water unsuitable for drinking and causing various difficulties in these industries. Further, in a foundation work in building industry, it is indispensable to remove underground water from a foundation site before the foundation work starts. If a large quantity of iron and manganese is contained in the underground water, the iron and manganese must be removed from the underground water before the underground water is discharged to the sewerage because it is legally prohibited to discharge such underground water the sewerage without any treatment.

In a currently prevailing conventional water treatment device for removing iron or manganese, an oxidizing agent such, for example, as sodium hypochlorite or a flocculant such, for examle, as poly-aluminum chloride (PAC) is added to raw water to oxidize iron or manganese which is dissolved in the raw water and thereby convert it to iron oxide or manganese oxide which is insoluble in water and the iron oxide or manganese oxide is filtered out by filtering the raw water through filtering sand.

In the conventional water treatment device requiring addition of an oxidizing agent or a flocculant, however, a relatively large amount of oxidizing agent or flocculant is consumed in the device and, therefore, the cost of such oxidizing agent or flocculant is tremendous.

Further, since hypochlorous acid which is used as the oxidizing agent remains in water after the treatment for oxidizing iron and manganese, trihalomethane which is a carcinogen is generated and, for removing trihalomethane, the water must further be filtered through an activated carbon layer which adds to the cost of the water treatment. If provision of such activated carbon layer is omitted for economic reason, water after filtering must be constantly analyzed for preventing generation of trihalomethane caused by addition of an excessive amount of oxidizing agent and, if necessary, the amount of addition of the oxidizing agent must be adjusted. This method requires a high cost of maintenance in addition to the cost of purchasing the oxidizing agent.

Further, the conventional water treatment device generally is a complex and large-scale system including an aeration tank, a flocculation tank, a precipitation tank, a sand filter tower, an iron and manganese removing tower and a chemical agent tank and this system requires a large space for installation. It is impossible to install such a large device in a site of a limited space such in a town.

Furthermore, filtering sand which is used in this water treatment device requiring addition of an oxidizing agent is blocked by accumulated impurities and therefore must be replaced from time to time. The used sand to be abandoned must be treated as industrial waste because it contains a chemical agent and a place where it can be abandoned is extremely restricted by laws and regulations.

It is, therefore, an object of the present invention to provide a water treatment device capable of treating water soluble substance such as iron and manganese in underground water by oxidizing them and thereby making them insoluble with a simple and compact device without using an oxidizing agent or a flocculant.

DISCLOSURE OF THE INVENTION

For achieving the above described object of the invention, there is provided a water treatment device comprising a raw water supply tube, one or more jet nozzles, each being at one end portion thereof in communication with the raw water supply tube and having at the other end portion thereof a raw water jetting outlet for blowing out the raw water in a jet stream, one or more air introducing tubes provided in correspondence to said jet nozzle or jet nozzles, each being at one end portion thereof opened to the atmosphere and being at the other end portion thereof opened to the inside of a corresponding one of the jet nozzles upstream of the raw water jetting outlet, a filter container containing a filter layer having an upper surface thereof being provided below the jet nozzles with a predetermined interval from the raw water jetting outlets of the jet nozzles, and a filtered water outlet provided in the filter container for taking out water which has been filtered through the filter layer.

According to the invention, by turning raw water to a jet water stream by means of the jet nozzle which is at one end portion thereof in communication with the raw water supply tube and introducing air into the jet nozzle from the air introducing tube which is opened to the inside of the jet nozzle, the jet stream, air is drawn into the jet water stream and turned to a multiplicity of small air bubbles. The jet water stream containing the multiplicity of air bubbles is blown out of the raw water jetting outlet and is struck against the water surface above the filter layer disposed below the raw water jetting outlet thereby causing vehement aeration both in the water above the filter layer and on the surface of the filter layer. By virtue of this aeration, soluble substances such as iron and manganese contained in the water are oxidized and thereby are turned to insoluble substances which form flocks or precipitates and are caught on the surfaces of grains of the filtering material such as filtering sand which constitutes the filter layer. The filtered water from which the insoluble substances and other foreign matters have been removed by the filter layer is taken out of the filtered water outlet.

Accordingly, iron, manganese and other insoluble substances in raw water can be made insoluble and can thereby be filtered out with a simple and compact device without using chemicals such as an oxidizing agent or flocculant.

Further, since the filtered water contains a relatively large amount of dissolved oxygen as a result of the aeration, by connecting a known low-speed filtering device to the downstream side of the water treatment device of the present invention, propagation of aerobic iron bacteria which propagates in the filter layer of the slow-speed filtering device is enhanced and the iron removal efficiency of this slow-speed filtering device can thereby be improved.

Further, according to the invention, space required for installing the water treatment device of the present invention mainly is space for installing the filter container only and, therefore, space required can be much smaller than the space required for installing the conventional water treatment device. Thus, the water treatment device of the present invention can be readily installed in a site of a limited space in a town.

Furthermore, in a case where waste filtering sand is abandoned, it is not necessary to deal with it as an industrial waste so that there is no limitation in a site for abandoning it.

In one aspect of the invention, there is provided a water treatment device comprising a raw water supply tube, one or more jet nozzles, each being at one end portion thereof in communication with the raw water supply tube and having at the other end portion thereof a raw water jetting outlet for blowing out the raw water in a jet stream, one or more gas introducing tubes provided in correspondence to said jet nozzle or jet nozzles, each being at one end portion thereof connected to a gas supply source and being at the other end portion thereof opened to the inside of a corresponding one of the jet nozzles upstream of the raw water jetting outlet, a filter container containing a filter layer having an upper surface thereof being provided below the jet nozzles with a predetermined interval from the raw water jetting outlets of the jet nozzles, and a filtered water outlet provided in the filter container for taking out water which has been filtered through the filter layer.

According to this aspect of the invention, the gas introducing tube is connected to the gas supply source such as a gas pump or an air compressor whereby not only air but also other desired gas such, for example, as nitrogen gas or ozone can be supplied from the gas supply source. This enables a desired type of gas to be selected in accordance with the nature of substance to be filtered out. This also enables the flow rate of air or other gas to be controlled to an optimum value for the filtration.

As the above described filtering operation is continued, flocks of oxidized substances and other foreign matters are accumulated on the surface of the filter layer as time elapses with the result that the surface of the filter layer is closed with the flocks and other foreign matters and the filtering function of the filter layer thereby is reduced. In another aspect of the invention, the water treatment device comprises means for reciprocating the raw water supply tube in a plane parallel to the surface of the filter layer and, therefore, by operating this means in a state where the water surface is adjusted to a level which is slightly above the surface of the filter layer to reciprocate the raw water supply tube in a plane parallel to the surface of the filter layer, the jet water stream containing a multiplicity of bubbles which is blown out of the raw water jetting outlet is struck vehemently against the surface of the filter layer which is closed with the flocks etc. and, as a result, the entire surface portion of the filter layer is turned over whereby the closed state of the surface of the filter layer with the flocks etc. is eliminated and the filtering function of the filter layer is restored.

In another aspect of the invention, the water treatment device further comprises a baffle plate provided between the raw water jetting outlets of the jet nozzles and the surface of the filter layer. The jet water stream blown out of the raw water jetting outlet of the jet nozzle is agitated further by the baffle plate to enhance the aeration.

In still another aspect of the invention, the water treatment device further comprises a filter layer support made of a plate screen provided at the bottom of the filter layer for supporting the filter layer, a reverse washing tube provided under the filter layer support for reverse washing the filter layer, and a reverse washing water outlet provided in the filter container.

According to this aspect of the invention, when the surface of the filter layer is significantly covered with the flocks of the oxidized substances and other foreign matters, supply of raw water to the filter container is temporarily suspended and reverse washing water is caused to flow from the reverse washing tube through the filter layer support upwardly. The flocks and foreign matters covering the surface of the filter layer are removed from the surface of the filter layer and are taken out of the reverse washing water outlet. The screen plate serves for causing the reverse washing water to flow in a uniform counter-stream throughout the filter layer from the bottom surface of the filter layer.

BRIEF DESCRIPTION OF THE DRAWINGS

In the accompanying drawings.

BEST MODE FOR CARRYING OUT THE INVENTION

Figure 1:
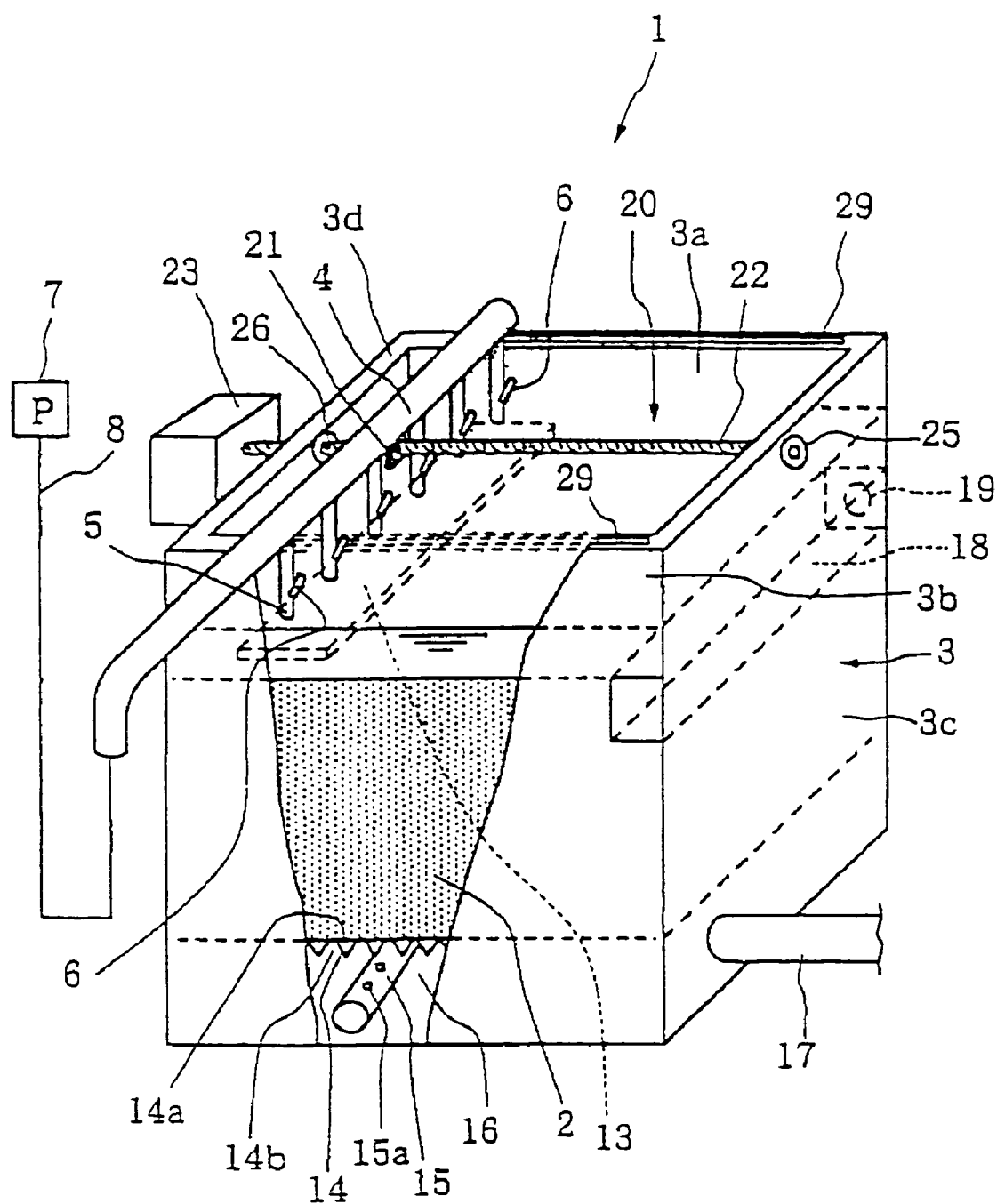
FIG. 1 is a perspective view showing an embodiment of the water treatment device according to the invention with a part of the side wall of a filter container being removed.
Figure 2:
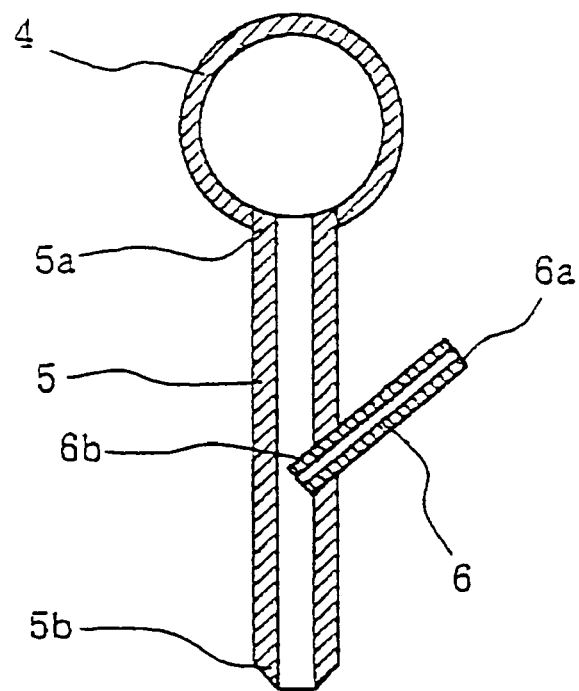
FIG. 2 is a sectional view showing a jet nozzle and an air introducing tube in an enlarged scale.
Figure 2:
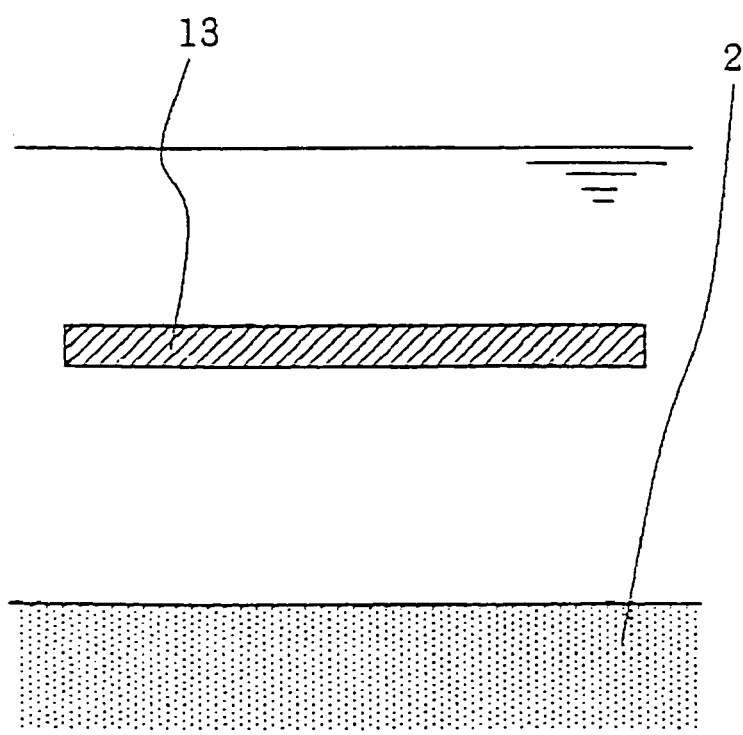

Referring now to FIGS. 1 to 4, an embodiment of the invention will be described.

A water treatment device 1 comprises, as its principal elements, a filter container 3 containing a filter layer 2, a raw water supply tube 4, jet nozzles 5 and an air introducing tubes 6.

The raw water supply tube 4 made of, e.g., a steel pipe, for supplying raw water to be filtered such as underground water or river water to the filter container 3 is connected to a water supply pump 7 by means of a rubber hose 8. The water supply pump 7 is provided with raw water from a water source of the raw water through a water receiving tank, if necessary, and supplies the raw water to the raw water supply tube 4 at a predetermined flow rate.

The raw water supply tube 4 is disposed above one end portion of the filter container 3 in such a manner that the raw water supply tube 4 extends in a plane parallel to the surface of the filter layer 2.

One or more (six in the illustrated example) jet nozzles 5 are provided in a manner to branch off downward from the raw water supply tube 4. As will be apparent from FIG. 2, the upstream side end portion 5a of each jet nozzle 5 is fitted in the raw water supply tube 4 in such a manner that the inside of the jet nozzle 5 communicates with the raw water supply tube 4. In the downstream side end portion of the jet nozzle 5 is formed a raw water jetting outlet 5b which blows out raw water in a jet water stream. A preferable inner diameter of the jet nozzle 5 is 3 mm to 6 mm.

One or more (six in the illustrated example) air introducing tubes 6 are provided, one for each, in the respective jet nozzles 5. As will be apparent from FIG. 2, the upstream side end portion 6a of each air introducing tube 6 projects obliquely upwardly from the jet nozzle 5 with its inside being opened to the atmosphere. The downstream side end portion 6b is opened to the inside of the jet nozzle 5 upstream of the raw water jetting outlet 5b. A preferable inner diameter of the air introducing tube 6 is 2 mm to 4 mm.

In the filter container 3, the filter layer 2 is provided with its upper surface being disposed below the jet nozzles 5 with a predetermined interval (e.g., about 35 cm) from the raw water jetting outlets 5b. The filter layer 2 is made of filtering sand of a uniform grain size and functions to filter the raw water by catching flocks of oxidized substances and other foreign matters in the raw water supplied as a jet stream from the jet nozzles 5. Flow rate of the raw water in the filter container 3, i.e., the filtering speed, differs depending upon the degree of filtration of object foreign matter (i.e., permissible concentration of the foreign matters in the filtered water). For normal filtering of iron and manganese, a filtering speed of 8 cm or below per minute is preferable.

A baffle plate 13 made of, e.g., a steel plate, is provided between the raw water jetting outlets 5b of the jet nozzles 5 and the surface of the filter layer 2 in such a manner that the baffle plate 13 extends in parallel to the raw water supply tube 4 and are disposed beneath the raw water jetting outlets 5b. The baffle plate 13 has its end portions in the longitudinal direction fixed to the inside wall surfaces of side walls 3a and 3b by means of, e.g., welding. By way of example, if the depth of water from the surface of water of the filter container 3 to the surface of the filter layer 2 is 30 cm and distance between the raw water jetting outlet 5b of the jet nozzle 5 to the surface of the water is 5 cm, a preferable depth of the baffle plate 13 from the surface of the water is about 5 cm (i.e., distance from the raw water jetting outlet 5b is about 10 cm).

A filter layer support 14 made of a plate screen (a wedge-wire screen in the illustrated example) is provided at a predetermined height from the bottom of the filter container 3 for supporting the filter layer 2 in its entirety. In the illustrated example, the wedge-wire screen is so disposed that it supports the filter layer 2 with its flat surface 14a and the width of slits 14b of the wedge-wire screen increases toward the lower end thereof. A reverse washing tube 15 is provided in a lower space 16 of the filter container 3 under the filter layer support 14 for reverse washing the filter layer 2. The reverse washing tube 15 is formed with a plurality of reverse washing water jetting outlets 15a opening toward the filter layer support 14. The reverse washing tube 15 is connected to an unillustrated reverse washing water supply source.

A pump may be provided downstream of the filter layer 2 so that water is sucked compulsorily by the pump for enhancing filtering efficiency.

By supporting the filter layer 2 by the filter layer support 14 made of a plate screen, a support structure made of generally three sand layers of sand, i.e., sand of a small grain, sand of a middle grain and sand of a large grain in the order from the top to the bottom which is required in the conventional water treatment device can be eliminated and, therefore, the design of the filter container can be simplified.

A filtered water outlet 17 for taking out water which has been filtered through the filter layer 2 is provided in a side wall 3c of the filter container 3 facing the lower space 16 of the filter container 3. In one end portion of the filter container 3 (in the right end portion in the illustrated example) is provided an overflow trough 18 with its upper edges being located slightly above the surface of the filter layer 2. One end of the overflow trough 18 is closed with a side wall 3b of the filter container 3 and the other end of the overflow trough 18 is dosed with a cover 19. The cover 19 of the overflow trough 18 is dosed when raw water is filtered and is opened during reverse washing to function as a reverse washing water outlet.

As the reverse washing device, a known device such, for example, as a device which starts the reverse washing operation automatically upon detecting that the water level of the filter container 3 has exceeded a predetermined level may be employed.

Figure 3:
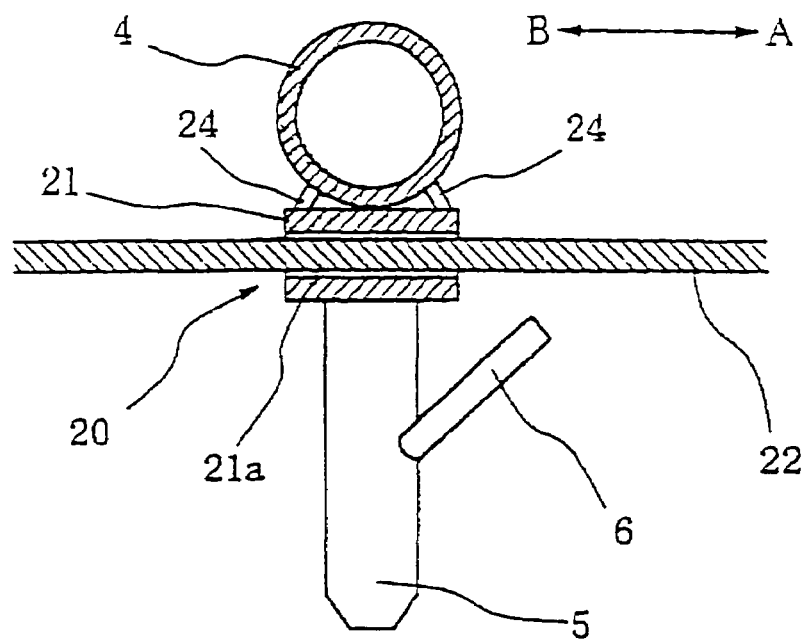
FIG. 3 is a sectional view showing a mechanism for reciprocating a raw water supply tube.
Figure 3:
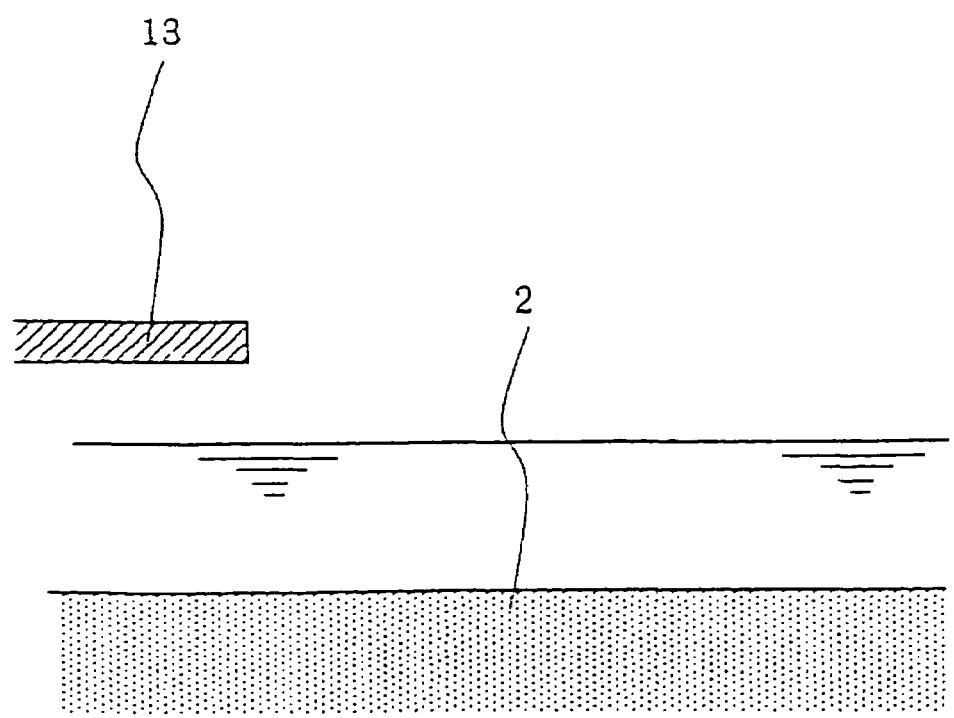

In the present embodiment, a raw water supply tube reciprocating mechanism 20 for reciprocating the raw water supply tube 4 in a plane parallel to the surface of the filter layer 2 is comprised of a screw box 21, a feed screw 22, a feed screw drive device 23 including an electric motor and reduction gear for driving the feed screw 22. The feed screw drive device 23 is fixed to a side wall 3d of the filter container 3. As shown in FIG. 3 in an enlarged scale, the screw box 21 is formed in its central portion with a screw hole 21a and is fixed to the raw water supply tube 4 with mounting members 24 which are fixed to the tube 4 by proper means such as welding in such a manner that the axial direction of the screw hole 21a crosses the axial direction of the raw water supply tube 4.

The feed screw 22 which is in threaded engagement with the screw hole 21a of the screw box 21 extends in a direction crossing the raw water supply tube 4 and is supported by bearings 25 and 26 which are secured to the side walls 3c and 3d of the filter container 3. The end portion of the feed screw 22 on the side of the side wall 3d extends through the side wall 3d to the outside of the filter container 3 and is connected to a feed screw drive device 23 so that the feed screw 22 is driven and rotated by the feed screw drive device 23. Accordingly, by operating the feed screw drive device 23, the feed screw 22 is rotated and the raw water supply tube 4 fixed to the screw box 21 thereby is moved in the direction of arrow A in FIG. 3. When the electric motor of the feed screw drive device 23 is reversely rotated, the raw water supply tube 4 is moved in the direction of arrow B in FIG. 3.

Figure 4:
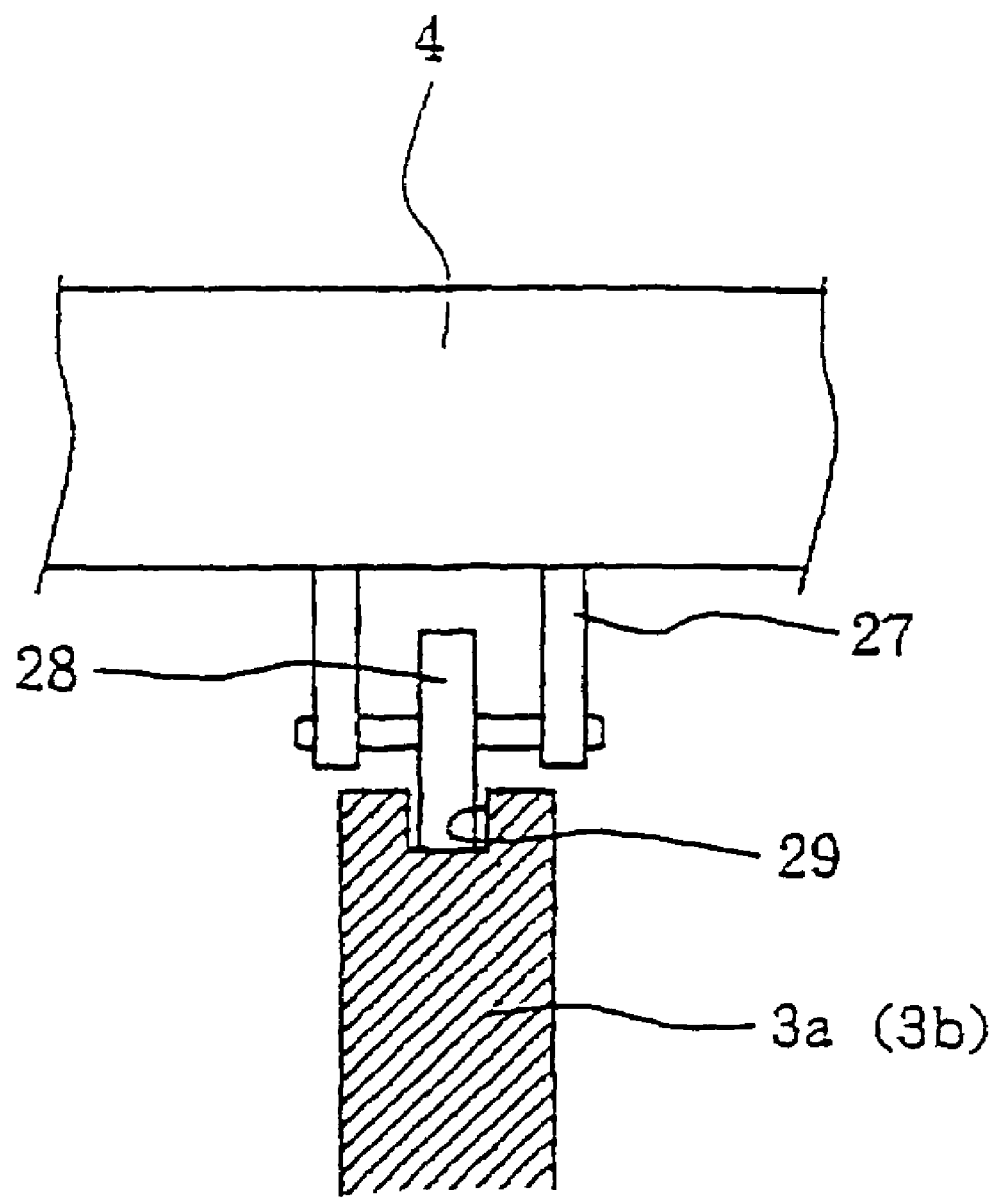
FIG. 4 is a sectinal view showing a mechanism for guiding the raw water supply tube.

For performing the reciprocating motion of the raw water supply tube 4 in a smooth and stable manner, in the present embodiment, rollers 28 are secured to the raw water supply tube 4 by means of mounting members 27 in locations on the side walls 3a and 3b of the filter container 3 as shown in FIG. 4 in an enlarged scale and the side walls 3a and 3b are formed in their upper end portion with guide grooves 29 in which the rotating rollers 28 are guided. For performing the reciprocating movement of the raw water supply tube 4 in a stable manner, other means may be employed such as a couple of feed screws.

The operation of the water treatment device of the above described embodiment will now be described.

During filtering of raw water, raw water is supplied from the water supply pump 7 to the jet nozzles 5 through the raw water supply tube 4 while the depth of water above the surface of the filter layer 2 is maintained, e.g., at 30 cm. The raw water is caused to flow in a jet water stream by setting the flow rate of water in the jet nozzles 5 at, e.g., 1.5 l/min. to 3 l/min. while air is drawn into the jet nozzles 5 from the air introducing tubes 6 opening to the inside of the jet nozzles 5 at a flow rate of, e.g., 0.5 l/min. to 1 l/min. The air is drawn into the jet water stream in a multiplicity of small air bubbles and the jet water stream containing the air bubbles is blown out of the raw water jetting outlets 5b of the jet nozzles 5 and is struck against the water surface of the filter layer 2 thereby causing vehement aeration on the water surface and on the filter layer 2. The baffle plate 13 enhances this aeration. By virtue of this aeration, soluble substances such as iron and manganese are oxidized and thereby are turned to insoluble substances which form flocks or precipitates and are caught on the surfaces of the grains of the filtering sand which constitutes the filter layer 2. The filtered water from which the insoluble substances and other foreign matters have been removed by the filter layer 2 is taken out of the filtered water outlet 17.

As the above described filtering operation is continued, flocks of oxidized substances and other foreign matters are accumulated on the surface of the filter layer 2 as time elapses. The surface of the filter layer 2 is covered and closed with these flocks and foreign matters and, as a result, the filtering function of the filter layer 2 is reduced.

In this case, as shown in FIG. 3, while the raw water and air are supplied with the water level being adjusted at a level of, e.g., 10 cm above the surface of the filter layer 2, the raw water supply tube reciprocating mechanism 20 is actuated to reciprocate the raw water supply tube 4 in a plane parallel to the surface of the filter layer 2. Since, by this operation, a jet water stream containing a multiplicity of air bubbles which is blown out of the raw water jetting outlets 5b is struck vehemently against the closed surface of the filter layer 2, the entire surface of the filter layer 2 is turned over whereby the closed state of the surface of the filter layer 2 is eliminated and the filter layer 2 restores its filtering function.

When flocks of oxidized substances and other foreign matters are accumulated on the surface of the filter layer 2 to such an extent that the turning over of the surface of the filter layer 2 by actuation of the raw water supply tube reciprocating mechanism 20 is not sufficient for restoring the filtering function completely, supply of raw water to the filter container 3 is temporarily suspended to reduce the water level on the surface of the filter layer 2 to zero, the cover 19 of the overflow trough 18 forming the reverse washing water outlet is opened and reverse washing water is caused to flow upwardly from the reverse washing water tube 15 through the filter layer support 14. The flocks and foregin matters covering the filter layer 2 thereby are removed and taken out of the reverse washing water outlet 19.

In the above described embodiment, the raw water supply tube reciprocating mechanism 20 is formed with a feed screw mechanism. The raw water supply tube reciprocating mechanism is not limited to this but may be composed of other means such as chain drive.

By way of an actual example, the above described embodiment of the invention was used to filter underground water collected in Sano City, Tochigi Prefecture, Japan. Change in the concentrations of iron and manganese in the underground water is shown in Table 1.

TABLE 1

| | before filtering (mg/l) | after filtering (mg/l) |
|---|---|---|
| iron | 18 | 0.6 |
| manganese | 2.0 | 1.7 |

Figure 5:
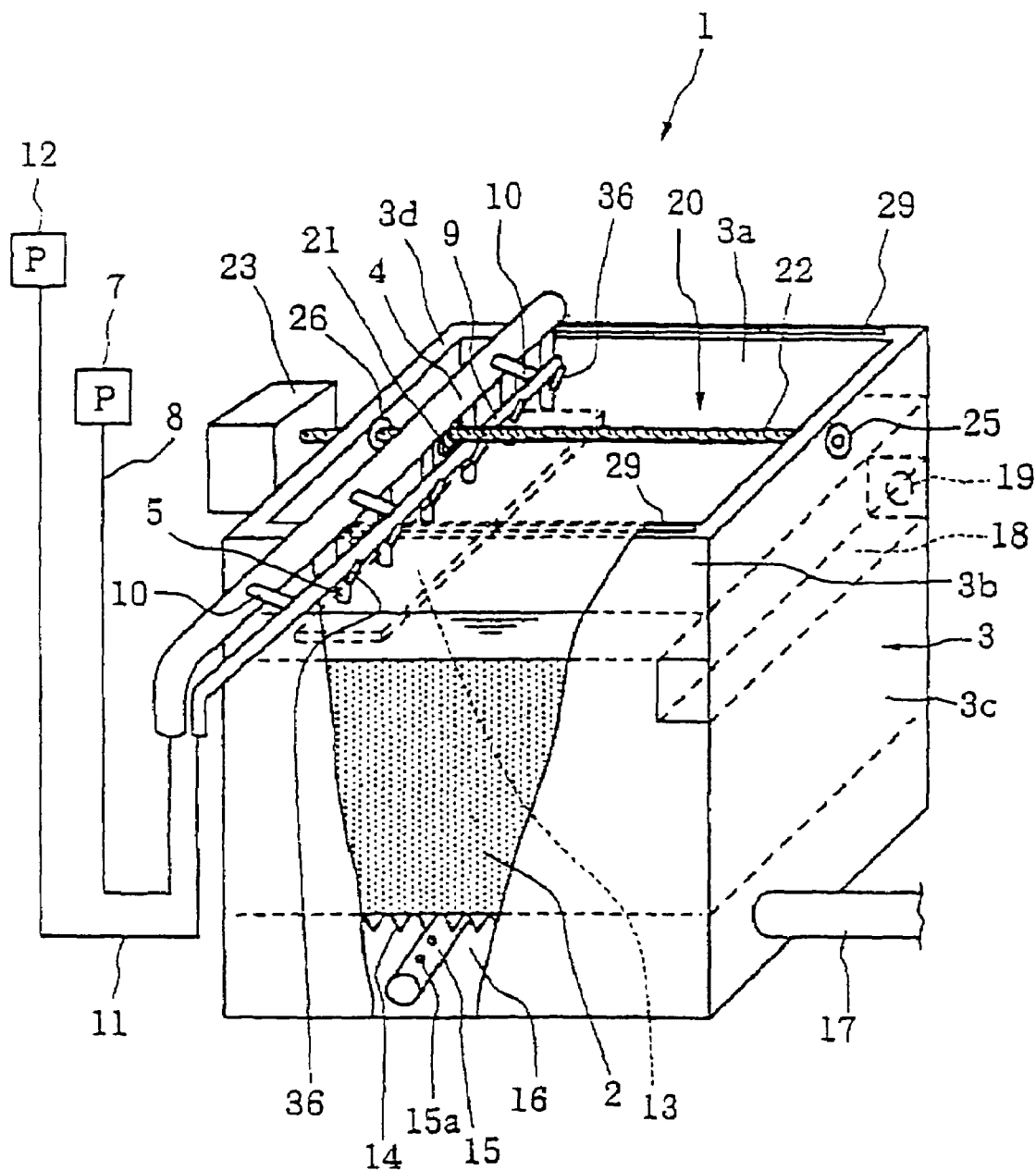
FIG. 5 is a perspective view showing another embodiment of the water treatment device according to the invention.
Figure 6:
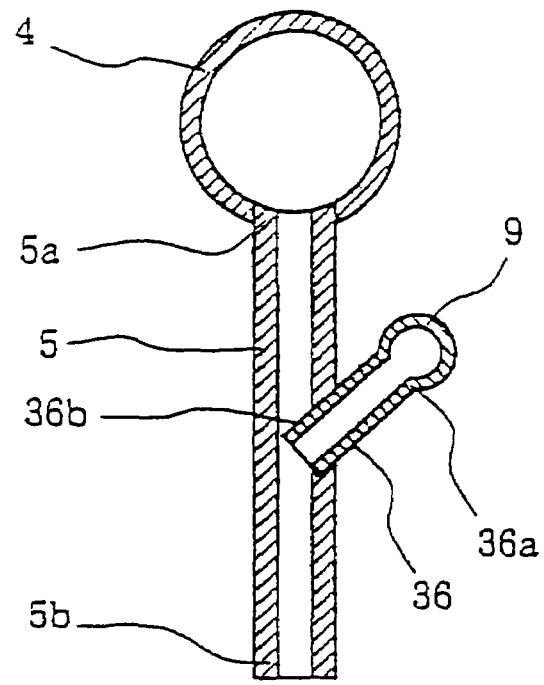
FIG. 6 is a sectional view showing a jet nozzle and a gas introducing tube of this embodiment in an enlarged scale.
Figure 6:
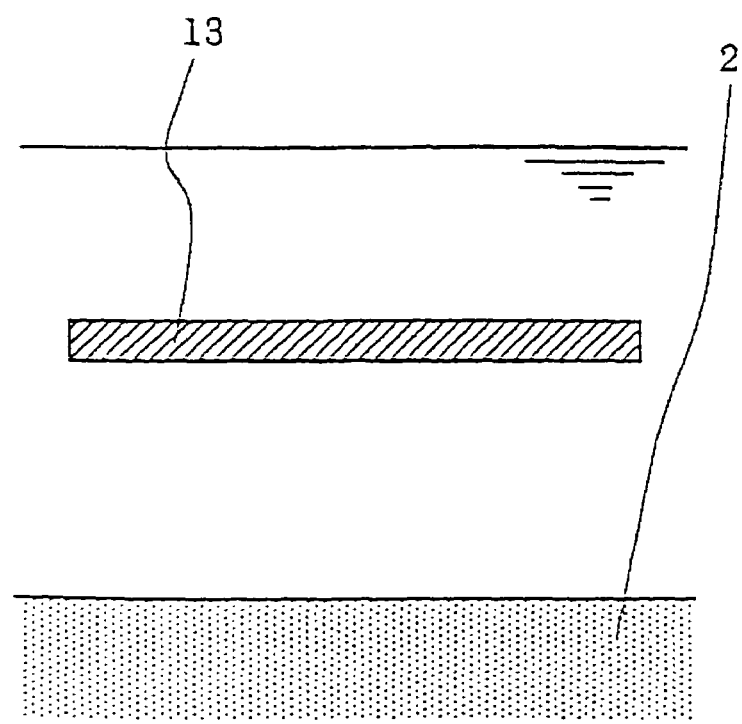

Referring to FIGS. 5 and 6, another embodiment of the invention will be described. In this embodiment, the same component parts as those in the previously described embodiment are shown by the same reference characters and description thereof will be omitted.

A water treatment device 1 comprises, as main component parts, a filter container 3 including a filter layer 2, a raw water supply tube 4, jet nozzles 5 and gas introducing tubes 36.

The raw water supply tube 4 made, e.g., of a steel tube, for supplying raw water to be filtered such as underground water or river water is connected to a water supply pump 7 through a rubber hose 8. The water supply pump 7 is provided with raw water from a water source of the raw water through a water receiving tank, if necessary, and supplies the raw water to the raw water supply tube 4 at a predetermined flow rate.

One or more (six in the illustrated example) jet nozzles 5 are provided in a manner to branch off downwardly from the raw water supply tube 4.

A gas supply tube 9 extends in parallel to the raw water supply tube 4 in a plane above the filter container 3 and is fixed to the raw water supply tube 4 by means of mounting members 10. The gas supply tube 9 is connected by means of a rubber hose 11 to an air supply source 12 such as an air pump or an air compressor which supplies air or a gas supply source 12 which supplies gas such as a nitrogen gas or ozone.

One or more (six in the illustrated example) gas introducing tubes 36 are provided in a manner to branch off from the gas supply tube 9. As will be apparent from FIG. 6, the upstream side end portion 36a of each gas introducing tube 36 is fitted in the gas supply tube 9 in such a manner that the inside of the gas introducing tube 36 communicates with the gas supply tube 9 and the downstream side end portion 36b of the gas introducing tube 36 is opened to the inside of the jet nozzle 5 upstream of the raw water jetting outlet 5b. A preferable inner diameter of the gas introducing tube 36 is 2 mm to 4 mm.

In this embodiment, the gas supply tube and the gas introducing tubes are provided outside of the raw water supply tube and the jet nozzles. Alternatively, the gas supply tube and the jet nozzles may be provide inside of the raw water supply tube and the jet nozzles.

According to ths embodiment, not only air but also a desired gas such as nitrogen gas or ozone can be supplyed from the gas supply source so that an optimum gas may be selected in accordance with the nature of the substance to be filtered out. Further, the flow rate of air or other gas may be controlled to an optimum value in accordance with the object of filtering.

INDUSTRIAL APPLICABILITY

The water treatment device of the present invention can be utilized for filtering various kinds of floating substance in raw water such as underground water, river water, lake water, water flowing from farm and mountain, including treating water soluble substance such as iron and manganese in such raw water by oxidizing them and making them insoluble in water and thereupon filtering them. The water treatment device can also be utilized for treating turbid water such as water containing red soil and various types of dirty water without using chemicals.

The invention claimed is:
1. A water treatment device comprising:
a raw water supply tube;
one or more jet nozzles, each being at one end portion thereof in communication with the raw water supply tube and having at the other end portion thereof a raw water jetting outlet for blowing out the raw water in a jet stream;

one or more air introducing tubes provided in correspondence to said jet nozzle or jet nozzles, each being at one end portion thereof opened to the atmosphere and being at the other end portion thereof opened to the inside of a corresponding one of the jet nozzles upstream of the raw water jetting outlet;

a filter container containing a filter layer having an upper surface thereof being provided below the jet nozzles with a predetermined interval from the raw water jetting outlets of the jet nozzles; and a filtered water outlet provided in the filter container for taking out water which has been filtered through the filter layer.

2. A water treatment device as defined in claim 1 further comprising means for reciprocating the raw water supply tube in a plane parallel to the surface of the filter layer.

3. A water treatment device as defined in claim 1 further comprising a baffle plate provided between the raw water jetting outlets of the jet nozzles and the surface of the filter layer.

4. A water treatment device as defined in claim 1 further comprising:
   a filter layer support made of a plate screen provided at the bottom of the filter layer for supporting the filter layer;
   a reverse washing tube provided under the filter layer support for reverse washing the filter layer; and
   a reverse washing water outlet provided in the filter container.

5. A water treatment device comprising:
a raw water supply tube;
one or more jet nozzles, each being at one end portion thereof in communication with the raw water supply tube and having at the other end portion thereof a raw water jetting outlet for blowing out the raw water in a jet stream;

one or more gas introducing tubes provided in correspondence to said jet nozzle or jet nozzles, each being at one end portion thereof connected to a gas supply source and being at the other end portion thereof opened to the inside of a corresponding one of the jet nozzles upstream of the raw water jetting outlet;

a filter container containing a filter layer having an upper surface thereof being provided below the jet nozzles with a predetermined interval from the raw water jetting outlets of the jet nozzles; and a filtered water outlet provided in the filter container for taking out water which has been filtered through the filter layer.

6. A water treatment device as defined in claim 5 further comprising means for reciprocating the raw water supply tube in a plane parallel to the surface of the filter layer.

7. A water treatment device as defined in claim 5 further comprising a baffle plate provided between the raw water jetting outlets of the jet nozzles and the surface of the filter layer.

8. A water treatment device as defined in claim 5 further comprising:
   a filter layer support made of a plate screen provided at the bottom of the filter layer for supporting the filter layer;
   a reverse washing tube provided under the filter layer support for reverse washing the filter layer; and
   a reverse washing water outlet provided in the filter container.

* * * * *